Patented Jan. 8, 1929.

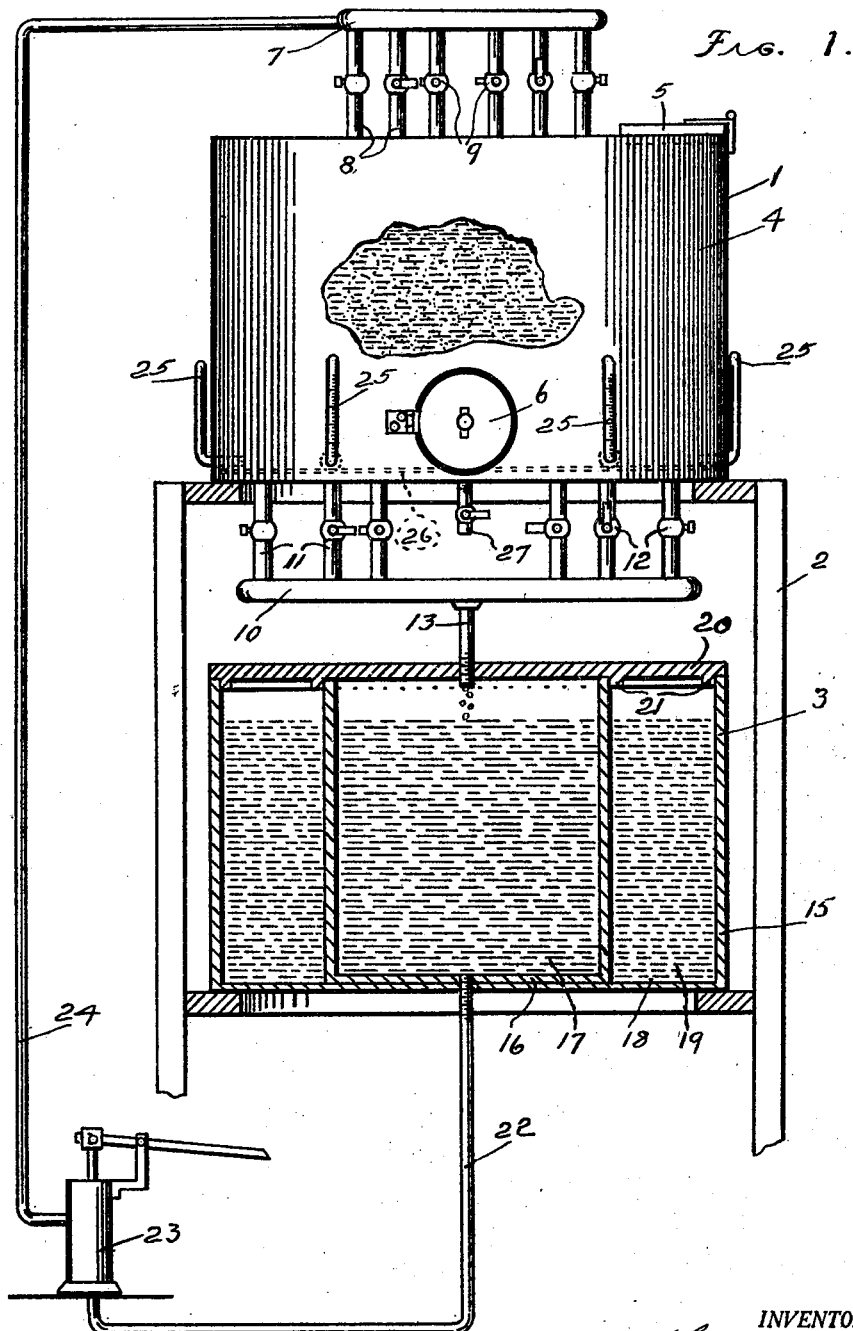

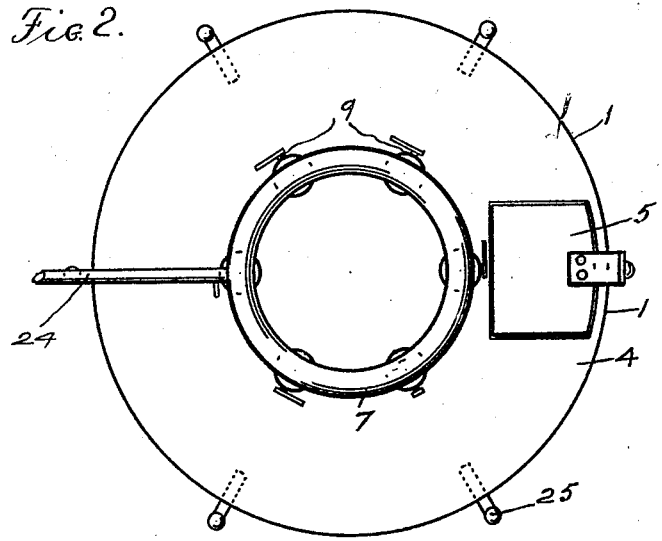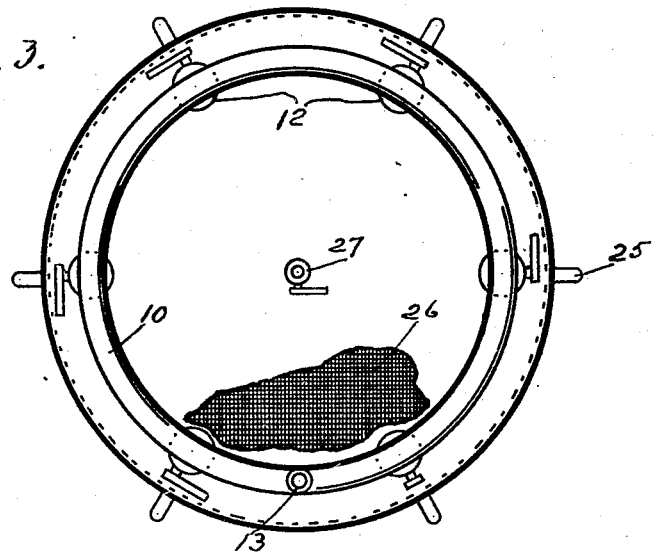

1,698,430

UNITED STATES PATENT OFFICE.

LOUIS A. CRIBARI, OF NEW YORK, N. Y.

GRAPE-PRESERVING APPARATUS.

Application filed December 2, 1926. Serial No. 152,256.

The invention relates generally to grape preserving apparatus and, particularly, to an apparatus of this character having facilities to preserve grapes in their natural state by subjecting the same to a circulating body of cold grape juice having a sugar content.

A further object of the invention is to provide the apparatus with a storage and preserving receptacle having selective inlets and selective outlets for regulating the inflow and discharge of the cold preservative grape juice to keep the contents of the receptacle uniformly at a pre-determined cold temperature.

A further object of the invention is to provide the storage and preserving receptacle with a plurality of temperature indicating devices arranged to indicate outwardly of the receptacle the temperature of the contents within.

I attain these objects and other advantages by means of the apparatus illustrated in the accompanying drawing in which—

Figure 1 is an elevation of a grape preserving apparatus constructed in accordance with my invention, the preserving receptacle being broken away to disclose its contents and the the freezer or cooler being shown in section.

Figure 2 is a top plan view of the storage and preserving receptacle, and showing the distributor associated with the inlets to the same and, Figure 3 is a plan view of the lower end of the storage and preserving receptacle, partly broken away to disclose the strainer therein, and showing the discharging member associated with the outlets of the receptacle.

Similar numerals of reference refer to corresponding parts throughout the several views.

The numeral 1 designates a storage and preserving receptacle which is made of any suitable material adapted to provide an air and water tight vessel. The receptacle is supported in an elevated position by a vertical frame 2 which, also, supports a freezer or cooler tank 3 at a lower point thereon. The receptacle, in this instance, consists of a hollow cylindrical body 4 provided at its upper end with a door 5 through which grapes are deposited in the receptacle and with a door 6 in its side through which grapes are discharged. On the upper end of the receptacle is an annular pipe 7 having an annular series of pipes 8 provided with cut-off valves 9, which pipes communicate with the receptacle and form valve controlled selective receptacle inlets. On the lower end of the receptacle is an annular pipe 10 having an annular series of pipes 11 provided with valves 12, which pipes communicate with the receptacle and form valve controlled selective receptacle outlets. A pipe 13 is arranged to communicate with the annular pipe 10 and with the freezer or cooler.

The freezer or cooler 2, in this instance, consists of a hollow cylindrical body 15 provided centrally with a hollow cylindrical receptacle 16 having therein a body of preservative grape juice 17, thus forming about the receptacle an annular chamber 18 containing a freezing or cooling element 19.

The freezer or cooler is provided with a lid or cover 20 having on its inner side annular flanges 21 adapted to fit the upper end of the annular chamber 18, the pipe 13 pierces said cover and penetrates the receptacle 16. A pipe 22 is arranged to communicate with the lower end of the receptacle 16 and with a pump 23 and a pipe 24 is arranged to communicate with said pump and with the annular pipe 7. Circumferentially of the lower portion of the receptacle 1 are mounted a series of individual thermometers 25 having their lower portions projecting inwardly of the receptacle a suitable distance to give outwardly indications of the relative temperatures of the contents therein. The thermometers are preferably located in the vicinity of the outlets of the receptacle so that the temperature of the contents of the receptacle may be ascertained at or near the outlets. A screen 26 is disposed on the floor of the receptacle 1 and is spread over the outlets 11 to prevent stoppage of the same. A faucet 27 is arranged in the lower side of the receptacle 1 to drain away the fluid contents when necessary.

The apparatus above described is used to preserve grapes in their natural state by storing them in the receptacle 1 and submerged in cold grape juice having a sugar content in excess of the sweetness of the grapes, which juice is circulated from the freezer or cooler 3 to the storage receptacle through all or a selected one or more of the inlet pipes 8 by means of the pump 23, the juice returning by gravity flow through the outlets 11 to the freezer or cooler, to thereby keep the entire contents of the receptacle 1 at a uniform pre-determined temperature, in this case 35 degrees F.

To use the apparatus for the purpose intended grape juice having a sugar content in excess of the natural sweetness of the grapes to be preserved is placed in the receptacle 16 of the freezer or cooler 3 and allowed to remain therein until its temperature is reduced by the freezing element to 35 degrees or less, F., whereupon the inlets 8 are opened and the pump 23 operated to force a suitable quantity of the juice from the freezer or cooler into the receptacle 1. Then a quantity of grapes are placed in the receptacle 1 through the door 5 and submerged in the cold juice therein. The displacement of the juice by the grapes causes the level of the juice to rise and, thereupon, one or more of the outlets 11 may be opened and the excess of juice allowed to flow through the annular pipe 10 and pipe 13 to the receptacle 16 in the freezer or cooler, as shown at 28 in Figure 1, and until the level of the juice in receptacle 1 is reduced to a point to keep the grapes submerged. When the receptacle 1 is filled with grapes the inlet pipes 8 and the outlets 11 are opened and the cold juice from the freezer is pumped into the receptacle where it percolates through the grapes to the outlets and thence into the freezer or cooler. This circulation of the preservative grape juice is continued until the thermometers 25 shall indicate temperatures of 35 degrees or less, whereupon, the inlets and outlets are closed. If the temperature of any section of the contents of the receptacle should rise above the pre-determined temperature it would be indicated by the thermometer at that section and, in that case, the inlet pipe 8 and outlet pipe 11 communicating with such section should be opened and the pump operated to introduce cold juice from the freezer into the section involved through inlet 8 the corresponding outlet 11 discharging the warmer juice to flow back to the freezer. When uniform temperatures of the sections of the receptacle are restored the inlets and outlets may be closed by their respective valves. When it is desired to use the grapes the outlets 11 are opened and the preservative juice allowed to gravitate from the receptacle to the freezer or cooler and, thereafter, the grapes may be withdrawn through the door 6. To clean the receptacle water or other cleansing fluid may be placed in the same through the door 5 and allowed to be discharged and wasted through the faucet 27.

The apparatus is employed in practicing the process of preserving grapes in their natural state, which process forms the subject matter of another application for patent, Serial No. 152,062, filed Dec. 1, 1926.

Having described the invention what I claim is:—

In a grape preserving apparatus, a cylindrical container having a door for the passage of fruit into the container and a door for the discharge of its contents, said doors being adapted to be sealed air and water tight, an annular series of filling inlets at the upper end of the container, an annular series of discharging outlets in the lower end of said container, an adjacent cooler for liquids in circulation with said container and including said filling inlets and said discharging outlets, and a series of temperature indicating devices arranged circumferentially of said container and extending therein on radial lines.

Dated New York, N. Y., November 19, 1926.

LOUIS A. CRIBARI.